(12) United States Patent
Inada et al.

(10) Patent No.: US 11,560,335 B2
(45) Date of Patent: Jan. 24, 2023

(54) MOLDED BODY FORMED FROM CURABLE COMPOSITION

(71) Applicant: KURARAY CO., LTD., Okayama (JP)

(72) Inventors: Shinya Inada, Okayama (JP); Soichiro Ikehata, Okayama (JP); Saburo Hada, Tsurugashima (JP)

(73) Assignee: KURARAY CO., LTD., Okayama (JP)

(*) Notice: Subject to any disclaimer, the term of this patent is extended or adjusted under 35 U.S.C. 154(b) by 342 days.

(21) Appl. No.: 16/769,720

(22) PCT Filed: Dec. 18, 2018

(86) PCT No.: PCT/JP2018/046549
§ 371 (c)(1),
(2) Date: Jun. 4, 2020

(87) PCT Pub. No.: WO2019/131321
PCT Pub. Date: Jul. 4, 2019

(65) Prior Publication Data
US 2020/0369570 A1  Nov. 26, 2020

(30) Foreign Application Priority Data

Dec. 26, 2017 (JP) .............................. JP2017-249674

(51) Int. Cl.
| | | |
|---|---|---|
| *C04B 28/26* | (2006.01) | |
| *B28B 1/50* | (2006.01) | |
| *B28B 1/52* | (2006.01) | |
| *C04B 16/06* | (2006.01) | |
| *C04B 40/00* | (2006.01) | |

(52) U.S. Cl.
CPC .............. *C04B 28/26* (2013.01); *B28B 1/50* (2013.01); *B28B 1/525* (2013.01); *C04B 16/0633* (2013.01); *C04B 16/0641* (2013.01); *C04B 40/0046* (2013.01)

(58) Field of Classification Search
CPC . C04B 14/14; C04B 16/0625; C04B 16/0633; C04B 16/0641; C04B 16/065; C04B 16/0691; C04B 22/064; C04B 28/006; C04B 28/26; C04B 40/0028; C04B 40/0046; C04B 40/0082; B28B 1/50; B28B 1/52; B28B 1/525; Y02P 40/10
See application file for complete search history.

(56) References Cited

U.S. PATENT DOCUMENTS

| | | | |
|---|---|---|---|
| 2012/0192765 A1 | 8/2012 | Huynh | |
| 2014/0264140 A1* | 9/2014 | Gong | ............... C04B 28/006 106/676 |

FOREIGN PATENT DOCUMENTS

| | | | |
|---|---|---|---|
| CN | 102910882 A | * | 2/2013 |
| JP | 05105497 A | | 4/1993 |
| JP | 0881246 A | | 3/1996 |
| JP | 08119709 A | | 5/1996 |
| JP | 2000072509 A | | 3/2000 |
| JP | 2003081679 A | | 3/2003 |
| JP | 2006114748 A | | 4/2006 |
| JP | 2006117478 A | | 5/2006 |
| JP | 5642180 B2 | | 12/2014 |
| JP | 2016121030 A | | 7/2016 |
| JP | 2016124709 A | | 7/2016 |
| JP | 2017186186 A | | 10/2017 |
| WO | WO-2014081277 A1 | | 5/2014 |

OTHER PUBLICATIONS

"Product information of Biei Hakudo Industry Co., Ltd.", URL: http://www.bieihakudo.co.jp/html/page02.html, (c)2000-2013, 2 pages (with English translation).
International Preliminary Report on Patentability and Written Opinion dated Jun. 30, 2020 in PCT/JP2018/046549 filed on Dec. 18. 2018 (English translation only), 16 pages.
International Search Report dated Mar. 19, 2019 in PCT/IP2018/046549, 2 pages.
Lee, Seung-Heun et al., "Properties of Classified Fly Ashes by Using of Electrostatic Precipitator and the Modification of Fly Ashes by the Removal of Carbon", Journal of the Society of Materials Science, Japan, vol. 48, No. 8, pp. 837-842, Aug. 15, 1999 (with English translation).
Yonezawa, Toshio et al., "[1009] Study on dispersion state of silica fumes in high strength concrete", Concrete Engineering Annual Report Collection, 1993, vol. 15, No. 1, pp. 69-74 (with English translation).
Office Action dated Jun. 21, 2022 in Japanese Patent Application No. 2019-561541 (with English translation), 15 pages.

* cited by examiner

*Primary Examiner* — Anthony J Green
(74) *Attorney, Agent, or Firm* — Element IP, PLC

(57) ABSTRACT

To provide a molded body which has high strength, high ductility, and excellent dimensional stability while maintaining incombustibility and fire resistance.
A molded body formed from a curable composition containing (A) at least one aluminosilicate source, (B) an alkali metal hydroxide, (C) a calcium ion source, and (D) an alkali resistant fiber, wherein the aluminosilicate source (A) has an $SiO_2$ content of 50% by mass or more based on a total mass of the aluminosilicate source (A), an amorphous ratio of 50% by mass or higher, and an average particle diameter of 50 μm or smaller, and comprises an aluminosilicate source having an average particle diameter of 10 μm or smaller in an amount of 30% by mass or more based on the total mass of the aluminosilicate source (A).

11 Claims, No Drawings

MOLDED BODY FORMED FROM CURABLE COMPOSITION

TECHNICAL FIELD

The present invention relates to a molded body formed from a curable composition. The present invention also relates to a method for producing a molded body.

BACKGROUND ART

For building interior and exterior materials, inorganic building materials such as fiber reinforced cement type building materials and calcium silicate panels are widely used. However, the conventional fiber reinforced cement type building materials have high bending strength, but a high dimensional change rate. On the other hand, the calcium silicate panels has a low dimensional change rate, but low bending strength due to constraint of reinforcing fibers resistant to autoclave curing. Also, the calcium silicate panels has problems of poor weather resistance, and a high energy cost related to the autoclave curing.

As a method for improving dimensional stability of a cement type building material, for example, Patent Document 1 describes a method for producing an inorganic building material comprising cement as main ingredient, by adding a reinforcing material and a specified admixture to the cement and mixing them.

In addition, as a method for obtaining a fiber reinforced inorganic body which is excellent in dimensional stability without curing at a high temperature, for example, Patent Document 2 describes a method for producing a fiber reinforced inorganic body, comprising: a step of preparing a slurry containing a cement-containing water-curable inorganic substance, a shrinkage reduction agent, a short fiber for reinforcing, water, and a water-insoluble vinyl monomer containing a polymerization initiator and an emulsifier; a step of molding this slurry; and a step of hardening and curing the obtained molded body.

PRIOR ART DOCUMENTS

Patent Documents

Patent Document 1: JP-A-2000-72509
Patent Document 2: JP-A-5-105497

SUMMARY OF THE INVENTION

Problems to be Solved by the Invention

For the cement type building material, a method for improving the dimensional stability by adding a specified admixture as described in Cited Document 1 has been adopted, but further improvement of the dimensional stability is required. In addition, as described in Cited Document 2, a method of adding a shrinkage reducing agent has also been examined, but the shrinkage reducing agent is water-soluble, and therefore easily eluted on being wetted with water, resulting in a problem of sustainability of efficiency.

Thus, an object of the present invention is to provide a molded body which has high strength, high ductility, and excellent dimensional stability while maintaining incombustibility and fire resistance.

Solutions to the Problems

In order to solve the above problems, the present inventors have made detailed examinations on a molded body formed from a curable composition, and have found that surprisingly the aforementioned problems can be solved by combining a pozzolanic reaction with an alkali-silica reaction hated in common sense, and this finding has led to the accomplishment of the present invention.

That means, the present invention includes the following suitable embodiments.

[1] A molded body formed from a curable composition containing (A) at least one aluminosilicate source, (B) an alkali metal hydroxide, (C) a calcium ion source, and (D) an alkali resistant fiber, wherein the aluminosilicate source (A) has an $SiO_2$ content of 50% by mass or more based on a total mass of the aluminosilicate source (A), an amorphous ratio of 50% by mass or higher, and an average particle diameter of 50 µm or smaller, and comprises an aluminosilicate source having an average particle diameter of 10 µm or smaller in an amount of 30% by mass or more based on the total mass of the aluminosilicate source (A).

[2] The molded body according to [1], containing at least a volcanic ash-derived substance as the aluminosilicate source (A).

[3] The molded body according to [1] or [2], wherein the curable composition contains 10 to 100 parts by mass of the alkali metal hydroxide (B) and 10 to 140 parts by mass of the calcium ion source (C) based on 100 parts by mass of the aluminosilicate source (A).

[4] The molded body according to any one of [1] to [3], wherein a content of the alkali resistant fiber (D) is 0.1 to 5 parts by mass based on 100 parts by mass of the molded body.

[5] The molded body according to any one of [1] to [4], wherein the alkali resistant fiber (D) has an average fiber diameter of 100 µm or smaller, and an aspect ratio of 50 to 2,000.

[6] The molded body according to any one of [1] to [5], wherein a variation coefficient of an average content of the alkali resistant fiber (D) contained in 10 cut pieces with a weight of 20 g cut out from a whole or a part of the molded body is 30% or lower.

[7] The molded body according to any one of [1] to [6], wherein the alkali resistant fiber (D) is at least one selected from a group consisting of a polyvinyl alcohol-based fiber, a polyethylene fiber, a polypropylene fiber, an acrylic fiber, and an aramid fiber.

[8] A method for producing a molded body, comprising
a step of mixing a component containing at least one aluminosilicate source (A), an alkali metal hydroxide (B), and a calcium ion source (C), with water,
a step of preparing a curable composition by adding an alkali resistant fiber (D) to the obtained mixture and further mixing the mixture, and
a step of obtaining the molded body by molding the obtained curable composition and then curing the curable composition.

[9] A method for producing a molded body, comprising
a step of mixing at least one aluminosilicate source (A) and an alkali metal hydroxide (B), with water,
a step of forming a precursor by heating the obtained mixture to 50 to 180° C. to react the mixture, and then cooling the mixture to 50° C. or lower,
a step of preparing a curable composition by adding a component containing a calcium ion source (C) and an alkali resistant fiber (D) to the obtained precursor and further mixing the mixture, and
a step of obtaining the molded body by molding the obtained curable composition and then curing the curable composition.

Effects of the Invention

The molded body according to the present invention has high strength, high ductility, and excellent dimensional stability while maintaining incombustibility and fire resistance.

EMBODIMENTS OF THE INVENTION

The molded body according to the present invention is formed from a curable composition containing (A) at least one aluminosilicate source, (B) an alkali metal hydroxide, (C) a calcium ion source, and (D) an alkali resistant fiber, wherein the aluminosilicate source (A) has an $SiO_2$ content of 50% by mass or more based on a total mass of the aluminosilicate source (A), an amorphous ratio of 50% by mass or higher, and an average particle diameter of 50 μm or smaller, and comprises an aluminosilicate source having an average particle diameter of 10 μm or smaller in an amount of 30% by mass or more based on the total mass of the aluminosilicate source (A).

<(A) Aluminosilicate Source>

The aluminosilicate source contains an aluminosilicate ($xM_2O.yAl_2O_3.zSiO_2. nH_2O$, wherein M is an alkali metal) as a main ingredient. Herein, the main ingredient means a component having the largest mass in the aluminosilicate source. The aluminosilicate source elutes cations such as aluminum and silicon by contacting with a high alkaline solution [aqueous solution of alkali metal hydroxide (B)], which are involved in a polycondensation reaction, a pozzolanic reaction, and a water-insoluble substance production reaction that are mentioned below.

The reaction between the $SiO_2$ in the aluminosilicate and the alkali metal in the alkali metal hydroxide (B) is known as an alkali-silica reaction. Since the alkali-silica gel production by the alkali-silica reaction causes cracks in concrete by expansion due to water absorption, measures for suppressing the alkali-silica reaction have been continually examined in the concrete technology field for many years.

Such an alkali-silica reaction and the pozzolanic reaction are combined, and a product of the alkali-silica reaction is used as a raw material for the aforementioned three reactions, so that the molded body according to the present invention can have high strength, high ductility, and excellent dimensional stability while maintaining incombustibility and fire resistance.

The aluminosilicate source (A) used in the present invention has 50% by mass or more of $SiO_2$ (silicon dioxide) content based on the total mass of the aluminosilicate source (A). The $SiO_2$ content is preferably 55% by mass or more, more preferably 60% by mass or more, and particularly preferably 65% by mass or more based on the total mass of the aluminosilicate source (A). When the $SiO_2$ content is the above lower limit value or higher, a silicate monomer required for the reaction between the aluminosilicate source (A) and the alkali metal hydroxide (B) or the calcium ion source (C) can be readily and sufficiently supplied, so that it is possible to more readily obtain higher dimensional stability, higher strength, and higher ductility in the produced molded body. The upper limit value of the $SiO_2$ content is not particularly limited, and is normally 80% by mass.

The $SiO_2$ content can be measured by e.g. a fluorescent X-ray analysis. The $SiO_2$ content in the aluminosilicate source (A) can be adjusted to the aforementioned lower limit value or more by selecting and using one or two or more of substances described later as preferable examples of the aluminosilicate source (A), and/or pulverizing and classifying such substances to use a specified fraction.

Also, the aluminosilicate source (A) used in the present invention has an amorphous ratio of 50% by mass or higher. When the amorphous ratio is lower than 50% by mass, the desired dimensional stability, strength, and ductility of the produced molded body cannot be obtained due to low reactivity of the aluminosilicate source (A) with the alkali metal hydroxide (B) or the calcium ion source (C). The amorphous ratio is preferably 60% by mass or higher, more preferably 70% by mass or higher, particularly preferably 80% by mass or higher. When the amorphous ratio is the above lower limit value or higher, cations such as aluminum and silicon can readily eluted from the aluminosilicate source due to alkali components of the alkali metal hydroxide (B), and the cations can readily dissolve and react. Thus, it is possible to more readily obtain higher dimensional stability, higher strength, and higher ductility in the produced molded body, as well as higher quality stability. The upper limit value of the amorphous ratio is not particularly limited, and is normally 100% by mass.

The amorphous ratio can be measured by e.g. an X-ray diffraction analysis. The amorphous ratio in the aluminosilicate source (A) can be adjusted to the aforementioned lower limit value or higher by selecting and using one or two or more of the substances described later as preferable examples of the aluminosilicate source (A), and/or pulverizing and classifying such substances to use a specified fraction.

Also, the aluminosilicate source (A) used in the present invention has an average particle diameter of 50 μm or smaller, and comprises an aluminosilicate source having an average particle diameter of 10 μm or smaller in an amount of 30% by mass or more based on the total mass of the aluminosilicate source (A). When the aluminosilicate source (A) has an average particle diameter of larger than 50 μm, or when the aluminosilicate source (A) comprises an aluminosilicate source having an average particle diameter of 10 μm or smaller in an amount of 30% by mass or more based on the total mass of the aluminosilicate source (A), the desired dimensional stability, strength, and ductility cannot be obtained in the produced molded body due to low reactivity of the aluminosilicate source (A) with the alkali metal hydroxide (B) or the calcium ion source (C). The average particle diameter is preferably 30 μm or smaller, more preferably 20 μm or smaller, and particularly preferably 10 μm or smaller. The content of the aluminosilicate source (A) having the average particle diameter of 10 μm or smaller is preferably 50% by mass or more, more preferably 65% by mass or more, particularly preferably 70% by mass or more based on the total mass of the aluminosilicate source (A). When the average particle diameter is the above upper limit value or smaller and the content of the aluminosilicate source (A) having the average particle diameter of 10 μm or smaller is the above lower limit value or larger, it is possible to more readily obtain higher dimensional stability, higher strength, and higher ductility in the produced molded body, as well as higher quality stability. The lower limit value of the average particle diameter is not particularly limited, and is normally 1 μm. In addition, the upper limit value of the content of the aluminosilicate source having the average particle diameter of 10 μm or smaller is not particularly limited, and may be 100% by mass based on the total mass of the aluminosilicate source (A).

The average particle diameter can be measured by e.g. a laser diffraction/scattering method. The average particle diameter of the aluminosilicate source (A), and the content of the aluminosilicate source having the average particle diameter of 10 µm or smaller can be adjusted to the desired values by selecting and using one or two or more of substances described later as preferable examples of the aluminosilicate source (A), and/or pulverizing and classifying such substances to use a specified fraction.

Preferable examples of the aluminosilicate source (A) include industrial wastes such as fly ash, red mud, silica fume, and sewage sludge incineration ash; natural aluminosilicate minerals and their calcined products (e.g. metakaolin), volcanic ash, and the like. These substances are commercially available, and in the present invention, each of these substances may be used alone, or two or more of these substances may be used in combination.

As described above, pulverization and classification of one or two or more of the aforementioned substances make it possible to prepare the aluminosilicate source (A) which has the predetermined properties of the present invention, i.e. which has an $SiO_2$ content of 50% by mass or more based on a total mass of the aluminosilicate source (A), an amorphous ratio of 50% by mass or higher, and an average particle diameter of 50 µm or smaller, and comprises an aluminosilicate source having an average particle diameter of 10 µm or smaller in an amount of 30% by mass or more based on the total mass of the aluminosilicate source (A). Alternatively, from the aforementioned substances, a substance having the aforementioned predetermined properties in the present invention can be selected as the aluminosilicate source (A). Since the aluminosilicate source (A) having such properties shows good reactivity with the alkali metal hydroxide (B) or the calcium ion source (C), a molded body produced using the aluminosilicate source (A) has all of high strength, high ductility, and excellent dimensional stability, as well as higher quality stability.

Examples of the method for pulverizing and classifying the aforementioned substances include a method using a difference of a floating speed and furthermore a gravity separation action in a vibrating fluid bed, in which the substance is vibrated while passing an air flow from below using an air table, as described in Journal of the Society of Materials Science, Japan, Vol. 66, No. 8, pp. 574-581 (2017).

Preferably, the aluminosilicate source (A) contains volcanic ash from the viewpoint of more readily obtaining the aluminosilicate source (A) having the predetermined properties in the present invention, the viewpoint of low production cost, the viewpoint of not too large alumina content as described later, and the viewpoint of quality stability. This is in line with an idea that Japan has a lot of volcanos and a lot of volcanic ash nationwide, and utilization of this resource unique to Japan as a raw material is very useful also in terms of national policy. Consequently, in one embodiment of the present invention, the molded body preferably contains at least a volcanic ash-derived substance as the aluminosilicate source (A). More preferably, the aluminosilicate source (A) is composed of volcanic ash.

<(B) Alkali Metal Hydroxide>

The alkali metal hydroxide used in the present invention exhibits a high alkalinity in water, and has an action to activate the aluminosilicate source (A) on coming into contact with the aluminosilicate source (A) to elute cations such as Al and Si.

Preferable examples of the alkali metal hydroxide include sodium hydroxide, potassium hydroxide, lithium hydroxide, and the like. In the present invention, each of the alkali metal hydroxides may be used alone, or two or more of the alkali metal hydroxides may be used in combination. From the viewpoint of low-cost, it is preferable to use sodium hydroxide. In addition, a part of sodium hydroxide may be replaced with potassium hydroxide in an amount that does not impair the advantage of the production cost.

The content of the alkali metal hydroxide is preferably 10 to 100 parts by mass, more preferably 11 to 90 parts by mass, and particularly preferably 12 to 80 parts by mass based on 100 parts by mass of the aluminosilicate source (A). When the content of the alkali metal hydroxide is within the above range, the alkali-silica reaction with the aluminosilicate source (A) can readily and sufficiently proceed, and therefore higher dimensional stability, higher strength, and higher ductility can be readily obtained in the produced molded body.

<(C) Calcium Ion Source>

The calcium ion source used in the present invention is a substance which elutes calcium ions on coming into contact with water and an alkali metal. The eluted calcium ion is involved in a pozzolanic reaction and a water-insoluble substance production reaction which are mentioned below.

Preferable examples of the calcium ion source include calcium oxide (CaO), calcium hydroxide [$Ca(OH)_2$], blast furnace slag, calcium chloride, calcium carbonate, and the like. In the present invention, each of these calcium ion sources may be used alone, or two or more of the calcium ion sources may be used in combination. From the viewpoint of reactivity, it is preferable to use calcium oxide, calcium hydroxide and the blast furnace slag.

When the blast furnace slag is used as the calcium ion source, the blast furnace slag generally contains not only calcium element but also silicon dioxide and alumina, and therefore may be sources of silicate monomers and aluminum ions which are involved in the polycondensation reaction, the pozzolanic reaction, and the water-insoluble substance production reaction. However, since the blast furnace slag contains calcium oxide in a ratio higher than each ratio of silicon dioxide and alumina and contains silicon dioxide only in a low ratio, the blast furnace slag does not correspond to the aluminosilicate source (A) in the present invention. The blast furnace slag is classified into crystalline slowly-cooled slags and amorphous water-granulated slags, and it is preferable to use the water-granulated slag as the calcium ion source (C) because of its latent hydraulic property and high reactivity. As a preferable form of the water-granulated blast furnace slag, a slug having an amorphous ratio of 90% or higher and the same average particle diameter as of the aluminosilicate source (A) is preferable.

The content of the calcium ion source is preferably 10 to 140 parts by mass, more preferably 12 to 130 parts by mass, particularly preferably 14 to 120 parts by mass based on 100 parts by mass of the aluminosilicate source (A). When the content of the calcium ion source is within the above range, ions necessary for the reaction can be readily and sufficiently supplied, so that higher dimensional stability, higher strength, and higher ductility can be readily obtained in the produced molded body.

<(D) Alkali Resistant Fiber>

The alkali resistant fiber used in the present invention has an action to enhance the strength and the ductility of the molded body.

The alkali resistant fiber is not particularly limited to organic fibers or inorganic fibers as long as the fiber has chemical resistance to alkali. Examples of the alkali resistant inorganic fibers include an alkali resistant glass fiber, a steel fiber, a stainless fiber, a carbon fiber, and the like. Examples of the alkali resistant organic fibers include various alkali resistant fibers such as a polyvinyl alcohol (hereinafter referred to as PVA in some cases)-based fiber, a polyolefin-based fiber (e.g. a polyethylene fiber, a polypropylene fiber, and the like), an ultrahigh molecular weight polyethylene fiber, a polyamide-based fiber (polyamide 6, polyamide 6,6, and polyamide 6,10, and the like), an aramid fiber (particularly a para-aramid fiber), a polyparaphenylenebenzobisoxazole-based fiber [e.g. a polyparaphenylenebenzoxazole (PBO) fiber], an acrylic fiber, a rayon-based fiber (e.g. a polynosic fiber, a solvent-spun cellulose fiber, and the like), a polyphenylene sulfide fiber (PPS fiber), and a polyetheretherketone fiber (PEEK fiber). Each of these alkali resistant fibers may be used alone, or two or more of the alkali resistant fibers may be used in combination.

Above all, the polyvinyl alcohol-based fiber, the polyethylene fiber, the polypropylene fiber, the acrylic fiber, and the aramid fiber are preferably used because they can readily provide a molded body with an excellent reinforcing property and can be produced at a low cost. Thus, in one embodiment of the present invention, the alkali resistant fiber is preferably at least one selected from a group consisting of the polyvinyl alcohol-based fiber, the polyethylene fiber, the polypropylene fiber, the acrylic fiber, and the aramid fiber.

An average fiber diameter of the alkali resistant fiber is preferably 100 μm or smaller, more preferably 80 μm or smaller, and particularly preferably 60 μm or smaller. The average fiber diameter of the alkali resistant fiber is normally 3 μm or larger, more preferably 5 μm or larger, particularly preferably 7 μm or larger. When the average fiber diameter of the alkali resistant fibers is the above upper limit value or smaller, such an alkali resistant fiber also has sufficient fiber strength and can be industrially stably produced. When the average fiber diameter of the alkali resistant fiber is the above lower limit value or larger, the fiber can be readily dispersed more uniformly in a matrix. Herein, in the present invention, the matrix means a base material portion binding with the alkali resistant fibers in the molded body.

An aspect ratio of the alkali resistant fiber is preferably 50 to 2,000, more preferably 50 to 450 from the viewpoint of more readily achieving both good dispersibility of the fiber in the curable composition and good reinforcing property after hardening of the curable composition. Herein, the aspect ratio in the present invention means a ratio (L/D) between a fiber length (L) and a fiber diameter (D).

The average fiber diameter and the aspect ratio of the alkali resistant fiber are determined in accordance with JIS L 1015 "Test Methods for Man-Made Staple Fibres (8.5.1)".

The average fiber strength of the alkali resistant fiber according to the present invention is preferably 3 cN/dtex or higher, more preferably 4 cN/dtex or higher, particularly preferably 5 cN/dtex or higher. When the average fiber strength of the alkali resistant fiber is the above lower limit value or higher, the reinforcing performance for the molded body can be readily enhanced. The upper limit value of the average fiber strength of the alkali resistant organic fiber according to the present invention is appropriately set depending on the type of the fiber, and is e.g. 30 cN/dtex or lower. The average fiber strength can be determined in accordance with JIS L 1015 "Test Methods for Man-Made Staple Fibres (8.5.1)".

When a PVA-based fiber, e.g. a vinylon fiber is used as the alkali resistant fiber, a PVA-based fiber having the following properties may be used. A polymerization degree of the PVA-based polymer constituting the PVA-based fiber can be appropriately selected depending on an intended purpose, and is not particularly limited. Considering the mechanical properties and the like of the obtained fiber, an average polymerization degree of the PVA-based polymer determined from a viscosity of an aqueous solution of the polymer at 30° C. is preferably about 500 to 20,000, more preferably about 800 to 15,000, particularly preferably about 1,000 to 10,000. Above all, the average polymerization degree of the PVA-based polymer is preferably 1,000 or higher, more preferably 1,200 or higher, even more preferably 1,500 or higher, particularly preferably 1,750 or higher from the viewpoint of the strength of the obtained fiber. The PVA-based polymer may be a medium polymerization product having an average polymerization degree of 1,000 or higher to lower than 3,000, or a high polymerization product having an average polymerization degree of 3,000 or higher. The average polymerization degree of the PVA-based polymer means a viscosity-average polymerization degree, and can be measured in accordance with JIS K 6726.

A saponification degree of the PVA-based polymer can also be appropriately selected depending on an intended purpose, and is not particularly limited. The saponification degree of the PVA-based polymer may be e.g. 95 mol % or higher, preferably 98 mol % or higher from the viewpoint of the dynamic properties of the obtained fiber. The saponification degree of the PVA-based polymer may be 99 mol % or higher, or 99.8 mol % or higher. When the saponification degree of the PVA-based polymer is the above lower limit value or higher, good mechanical properties, good process passing properties, good production cost, and the like can be readily obtained for the obtained fiber. The saponification degree of the PVA-based polymer can be measured in accordance with JIS K 6726.

The PVA-based fiber used in the present invention can be produced by a process that such a PVA-based polymer is dissolved in a solvent, spun by any method of a wet spinning, a dry-wet spinning, and a dry spinning, and drawn by dry heat. The wet spinning refers to a method in which a spinning dope is directly discharged from a spinning nozzle to a solidification bath. The dry-wet spinning refers to a method in which a spinning dope is once discharged from a spinning nozzle into air or an inert gas at a certain distance and then introduced into a solidification bath. The dry spinning refers to a method in which a spinning dope is discharged into air or an inert gas. After spinning, the PVA-based fiber may be drawn as necessary. In addition, a treatment such as acetalization that is generally carried out in the production may be performed.

A solvent used for the spinning dope of the PVA-based fiber is not particularly limited as long as the solvent can dissolve the PVA-based polymer. For example, one, or a combination of two or more of water, dimethylsulfoxide (DMSO), dimethylformamide, dimethylacetamide, and a polyhydric alcohol (e.g. glycerol, ethylene glycol, triethylene glycol, and the like) may be used. In the present invention, when wet spinning is performed, it is preferable to use water or an organic solvent as the solvent. Above all, water and DMSO are particularly preferable from the viewpoints of ease in supply, and influence on environmental load. A polymer concentration in the spinning dope varies depending on the composition and the polymerization degree of the PVA-based polymer as well as the type of the solvent, but is generally 6 to 60% by mass.

Also in the dry spinning, the aforementioned solvent may be used. In this case, water or an organic solvent may be used.

Unless the effect of the present invention is impaired, the spinning dope may contain not only the PVA-based polymer but also additives and the like depending on an intended purpose. Examples of the additives include boric acid, a surfactant, an antioxidant, a decomposition inhibitor, an antifreezing agent, a pH adjuster, a masking agent, a colorant, an oil agent, and the like.

A solvent used for the solidification bath may be appropriately selected depending on the type of the solvent used in the spinning dope. When the spinning dope is an aqueous solution, an aqueous solution of an inorganic salt (e.g. sodium sulfate, ammonium sulfate, sodium carbonate, sodium hydroxide, or the like) having an ability to solidify the PVA-based polymer, and an alkaline aqueous solution may be used as the solidification bath. When the spinning dope is an organic solvent solution, an organic solvent having an ability to solidify the PVA-based polymer may be used as the solidification bath, examples of the organic solvent include an alcohol such as methanol, ethanol, propanol, and butanol, a ketone such as acetone, methylethylketone, and methylisobutylketone, and the like.

In the present invention, the PVA-based fiber obtained by dry spinning, or the PVA-based fiber obtained from a spinning dope containing water or an organic solvent as a solvent by wet spinning is preferable from the viewpoint of the fiber strength.

To extract and remove the solvent of the spinning dope from a solidified raw yarn, the yarn may be passed through an extraction bath, and at the same time as the extraction, the raw yarn may be wet-drawn. In addition, after the wet drawing, the fiber is dried, and if necessary, may be further drawn by dry heat. When drawing is performed, a total draw ratio (a product between the draw ratio after the wet drawing and the draw ratio after the drying) may be e.g. about 5 to 25, preferably about 8 to 20.

As the alkali resistant fiber, a commercially available fiber may be used. Examples of the commercially available fiber include an organic fiber such as a vinylon fiber, trade name "KURALON" produced by KURARAY Co., Ltd., and a nylon fiber, trade name "TOUGH-BINDER" produced by Toray Industries, Inc., as well as an inorganic fiber such as trade name "ARG Fiber 25 µm" produced by Nippon Electric Glass Co., Ltd., and trade name "Anti-Crack HD" produced by Taiheiyo Materials Co., and the like.

A content of the alkali resistant fiber is preferably 0.3 to 20 parts by mass, more preferably 0.5 to 15 parts by mass, particularly preferably 0.7 to 10 parts by mass based on 100 parts by mass of the aluminosilicate source (A). When the content of the alkali resistant fiber is within the above range, higher strength and higher ductility can be readily obtained in the produced molded body.

In one embodiment of the present invention, a content of the alkali resistant fiber (D) is preferably 0.1 to 5 parts by mass, more preferably 0.2 to 4 parts by mass, and particularly preferably 0.3 to 3 parts by mass based on 100 parts by mass of the molded body. When the content of the alkali resistant fiber is within the above range, higher strength and higher ductility can be readily obtained in the produced molded body. The content of the alkali resistant fiber (D) in the molded body can be determined in accordance with a method mentioned below in the Examples.

In one embodiment of the present invention, a variation coefficient of an average content of the alkali resistant fiber (D) contained in 10 cut pieces with a weight of 20 g cut out from the whole or a part of the molded body is preferably 30% or lower, more preferably 25% or lower, particularly preferably 20% or lower. This means that, the lower the variation coefficient of the average content of the alkali resistant fiber (D) is, the more uniformly the alkali resistant fiber (D) contained in the molded body is dispersed. Thus, a more stable quality, higher strength, and higher ductility can be readily obtained in the molded body. The variation coefficient can be determined in accordance with a method mentioned below in the Examples.

<Optional Components>

The curable composition according to the present invention may contain the aluminosilicate source (A), the alkali metal hydroxide (B), the calcium ion source (C), and the alkali resistant fiber (D), and furthermore, as optional components, one or more components selected from a group consisting of an aggregate, an alkali metal source different from the alkali metal hydroxide (B), and an admixture. The strength and the ductility of the molded body can be enhanced by adding the aggregate and the admixture.

As the aggregate, an aggregate generally used for concrete and mortar may be used. The aggregate is different from the aforementioned aluminosilicate source (A). Aggregates are classified into fine aggregates and coarse aggregates depending on sizes of particles, into natural aggregates and artificial aggregates depending on origins, and into light aggregates, normal aggregates, and heavy aggregates depending on densities. Each of these aggregates may be used alone, or two or more of the aggregates may be used in combination.

The fine aggregate may have a particle diameter of 5 µm or smaller and examples of the fine aggregate include sand having a particle diameter of 5 µm or less; and a fine aggregate obtained by powderizing or granulating an inorganic material such as silica stone, slag, slag particle, volcanic ash, various sludge, and rock mineral. Examples of the sand include sands such as river sand, mountain sand, sea sand, pulverized sand, silica sand, scoria, glass sand, iron sand, ash sand, calcium carbonate, and artificial sand. Each of these fine aggregates may be used alone, or two or more of these fine aggregates may be used in combination.

The coarse aggregate contains 85% by mass or more of particles having a particle diameter of 5 µm or larger based on the total amount of the coarse aggregate. The coarse aggregate may be composed of particles having a particle diameter of larger than 5 µm. Examples of the coarse aggregate include various gravels, artificial aggregate, recycled aggregate (such as recycled aggregate of construction waste), and the like. Each of these coarse aggregates may be used alone, or two or more of these aggregates may be used in combination.

Examples of the light aggregate include a natural light aggregate such as volcanic gravel, expanded slag and cinder, as well as an artificial light aggregate such as foamed pearlstone, foamed perlite, foamed obsidian, vermiculite, shirasu balloon, and fly ash microballoon. Each of these light aggregates may be used alone, or two or more of these light aggregates may be used in combination.

In addition, the curable composition according to the present invention may further contain a functional aggregate in addition to the aforementioned aggregates. Herein, examples of the functional aggregate include a colored aggregate, a hard aggregate, an elastic aggregate, an aggregate having a specified shape, and the like, and specifically, a layered silicate (e.g. mica, talc, and kaolin), alumina, silica, and the like. A ratio of the functional aggregate to the aggregate can be appropriately set depending on a type of each aggregate. For example, a mass ratio between the aggregate and the functional aggregate (aggregate/functional aggregate) may be 99/1 to 70/30, preferably 98/2 to 75/25, more preferably 97/3 to 80/20. Each of these functional aggregates may be used alone, or two or more of these functional aggregates may be used in combination.

When the curable composition according to the present invention contains the aggregate, a content of the aggregate is preferably 30 to 500 parts by mass, more preferably 50 to 400 parts by mass, particularly preferably 80 to 300 parts by mass based on 100 parts by mass of the aluminosilicate source (A). When the aggregate content is within the above range, higher strength and higher ductility can be readily obtained in the produced molded body.

Examples of the alkali metal source different from the alkali metal hydroxide (B) include an alkali metal silicate such as sodium silicate, potassium silicate and lithium silicate; an alkali metal carbonate such as sodium carbonate, potassium carbonate and lithium carbonate; and an alkali metal chloride such as sodium chloride and potassium chloride. In the present invention, each of these alkali metal sources may be used alone, or two or more of these alkali metal sources may be used in combination. Since this alkali metal source exhibits a high alkalinity in water, this alkali metal source has an action to activate the aluminosilicate source (A) on coming into contact with the aluminosilicate source (A) to elute cations such as Al and Si, like the alkali metal hydroxide (B). Thus, when this alkali metal source is added to the curable composition, this alkali metal source has an effect of helping the activation of the aluminosilicate source (A) by the alkali metal hydroxide (B).

When an alkali metal silicate is used as an alkali metal source different from the alkali metal hydroxide (B), it is preferable to use sodium silicate from the viewpoint of low-cost. In addition, a part of sodium silicate may be replaced by potassium silicate in an amount that does not impair the advantage of the production cost. Sodium silicate may be used in a form of water glass (aqueous solution containing a high concentration of sodium silicate) obtained by dissolving and heating sodium silicate in water. The alkali metal silicate may be a source of the silicate monomer involved in the polycondensation reaction, the pozzolanic reaction, and the water-insoluble substance production reaction.

When the curable composition according to the present invention contains water glass, a content of water glass is preferably 5 to 80 parts by mass, more preferably 10 to 70 parts by mass, particularly preferably 15 to 60 parts by mass in terms of a solid content of water glass, based on 100 parts by mass of the aluminosilicate source (A). When the content of water glass is within the above range, even if the silicate monomer derived from the aluminosilicate source (A) is not sufficiently supplied e.g. due to reaction conditions or the like, the silicate monomer required for the reaction can readily and sufficiently be prepared and supplied. Thus, higher dimensional stability, higher strength, and higher ductility can be readily obtained in the produced molded body.

<Action Mechanism for Obtaining Molded Body Having High Strength, High Ductility, and Excellent Dimensional Stability while Maintaining Incombustibility and Fire Resistance>

Although an action mechanism for obtaining the molded body according to the present invention having the excellent properties is unclear, a non-limiting action mechanism based on presumption is described below.

The following action mechanism is presumed. First, a silanol is produced by an alkali-silica reaction between silica ($SiO_2$) derived from the aluminosilicate source (A) and the alkali metal derived from the alkali metal hydroxide (B). The silanol is polycondensed with a component mainly composed of aluminum and released from the aluminosilicate source (A) to form an inorganic polymer. Second, a pozzolanic reaction is caused between a soluble silica ($SiO_2^{2-}$) produced by the alkali-silica reaction and calcium ions derived from the calcium ion source (C) to form a C—S—H (calcium silicate hydrate) hardened body. Third, the silanol produced by the alkali-silica reaction is reacted with calcium ions derived from the calcium ion source (C) to produce a water-insoluble $CaO.nSiO_2.mH_2O.2NaOH$. And thereby, the excellent strength, ductility, and dimensional stability of the molded body according to the present invention can be obtained. In addition, the molded body according to the present invention is reinforced by the alkali resistant fiber so as to have further improved strength and ductility, and is made of the inorganic hardened body so as to have incombustibility and fire resistance.

Generally, in the concrete technology field, since water absorption and expansion of the alkali-silica gel produced by the alkali-silica reaction generate cracks that reduce durability of concrete structures, measures for suppressing the alkali-silica reaction have been continuously examined for many years. The present invention makes it possible to provide a molded body having the high strength, high ductility, and excellent dimensional stability while maintaining incombustibility and fire resistance by a novel and surprising technique using a combination of such an alkali-silica reaction with the pozzolanic reaction When the proportion of the alumina contained in the aluminosilicate source (A) is too high, the aforementioned first reaction can easily proceed, so that the proportion of the inorganic polymer may be increased in the molded body. As a result, the aforementioned second reaction and third reaction can hardly proceed, so that the proportions of the aforementioned C—S—H hardened body and the water-insoluble product may be lower. As a result, the dimensional stability of the molded body can readily decrease, and therefore it is preferable that the proportion of the alumina contained in the aluminosilicate source (A) is relatively low. Thus, as the aluminosilicate source (A), a substance generally having a relatively low proportion of alumina, e.g. fly ash or volcanic ash is preferably used, and volcanic ash is more preferably used.

<Method for Producing Molded Body>

The molded body according to the present invention can be produced by e.g. a method comprising a step of mixing a component containing at least one aluminosilicate source (A), an alkali metal hydroxide (B), and a calcium ion source (C), with water, a step of preparing a curable composition by adding an alkali resistant fiber (D) to the obtained mixture and further mixing the mixture, and a step of obtaining the molded body by molding the obtained curable composition and then curing the curable composition.

As the aluminosilicate source (A), the alkali metal hydroxide (B), the calcium ion source (C), and the alkali resistant fiber (D) used in this production method, the components aforementioned in paragraphs <(A) Aluminosilicate Source>, <(B) Alkali Metal Hydroxide>, <(C) Calcium Ion Source>, and <(D) Alkali Resistant Fiber> respectively can be used. Additionally, in this production method, the components aforementioned in paragraph <Optional Components> can be used.

The mixing method in the first mixing step is not particularly limited. Generally, the mixing can be performed using a publicly-known or common mixer or the like (e.g. paddle mixer, drum mixer, truck agitator, horizontal twin axis mixer, Omni mixer (dispersion mixer), pan mixer, planetary mixer, Eirich mixer (intensive mixer), and the like) at room temperature (25° C.). When the aforementioned optional components (e.g. the aggregate, an alkali metal source different from the alkali metal hydroxide (B), and the like) are added, they can be added in this mixing step. An order of charging the respective components into a mixer or the like is not particularly limited. An amount of water is also not particularly limited, but is normally 30 to 300 parts by mass based on 100 parts by mass of the aluminosilicate source (A) from the viewpoint that the curable composition does not contain excessive water and homogeneity in a mixture can be readily obtained. Water may be independently added, or alternatively, when water glass is used as an optional component, water may be added in a form of water as the solvent of water glass. After water-soluble substances [e.g. the alkali metal hydroxide (B), the calcium ion source (C) having a water-soluble property such as calcium oxide and calcium hydroxide, and, if necessary, an optional water-soluble component (e.g. water glass or the like)] are previously dissolved in water to prepare an aqueous solution, the obtained aqueous solution may be mixed with a water-insoluble substance [e.g. the aluminosilicate source (A), the calcium ion source (C) having a water-insoluble property such as blast furnace slag, and, if necessary, an optional water-insoluble component (e.g. aggregate)]. At this time, the aqueous solution may be mixed with a mixture obtained by separately mixing the water-insoluble component. In addition, neither mixing time is particularly limited, and it is only necessary to mix the components until homogeneity in a mixture is obtained.

Subsequently, the alkali resistant fiber (D) is added to the obtained mixture and further mixed. A predetermined amount of the alkali resistant fiber (D) may be added in one portion or in two or more portions. As a method for adding the alkali resistant fiber (D), it is preferable to add fibers in a state that the fibers are aligned and converged in one direction from the viewpoint of more readily obtaining homogeneity in a curable composition. The mixing time after adding the fibers is not particularly limited, and it is only necessary to mix the components until homogeneity in a curable composition is obtained.

Subsequently, the obtained curable composition is molded, and then the curable composition is cured so as to resist the production process including form removal, transfer, and the like. In the production method according to the present invention, the obtained curable composition can be molded using a publicly-known technique such as a so-called casting method in which a curable composition is casted into an opened mold, a dehydration molding method in which a curable composition is dehydrated by pressing or suction, an injection molding method in which a slurry is injected into a closed mold, or an extrusion molding method in which a molded body having a certain shape can be molded through a mouth ring. At this time, a pressure and/or vibration may be applied as necessary. In addition, the curable composition may be pressed by pressing using an upper face mold, a roll, or the like. The curing may be performed normally under normal pressure or increased pressure, at a temperature of 20 to 95° C., e.g. room temperature (25° C.) or 90° C., and at a relative humidity of 20 to 99%. The curing time is appropriately set depending on a pressure, temperature, and/or humidity at which the curing is performed. The higher the pressure, temperature and humidity are, the shorter the curing time is, and the lower the pressure, temperature and humidity are, the longer the curing time is. For example, when normal pressure steam curing is carried out at a temperature of 80° C. and a humidity of 90% or higher (wet curing), the curing may be performed for about 4 to 24 hours. The curable composition is hardened by the curing. Subsequently, additional curing may be performed, and in this case, the curing conditions of the additional curing may be the same as or different from those of the initial curing.

Also, the molded body according to the present invention can be produced by e.g. a method comprising a step of mixing at least one aluminosilicate source (A) and an alkali metal hydroxide (B), with water a step of forming a precursor by heating the obtained mixture to 50 to 180° C. to react the mixture, and then cooling the mixture to 50 C° or lower, a step of preparing a curable composition by adding a component containing a calcium ion source (C) and an alkali resistant fiber (D) to the obtained precursor and further mixing the mixture, and a step of obtaining the molded body by molding the obtained curable composition and then curing the curable composition.

As the aluminosilicate source (A), the alkali metal hydroxide (B), the calcium ion source (C), and the alkali resistant fiber (D) used in this production method, the components aforementioned in paragraphs <(A) Aluminosilicate Source>, <(B) Alkali Metal Hydroxide>, <(C) Calcium Ion Source>, and <(D) Alkali Resistant Fiber> respectively can be used. Additionally, in this production method, the components aforementioned in paragraph <Optional Components> can be used.

The mixing method in the first mixing step is not particularly limited, but generally, the mixing can be performed using a publicly-known or common container or the like capable of heating and mixing (e.g. a stirring type heat-resistant container, a stirring type pressure-resistant container, a roller type pressure-resistant container, or the like) so that the mixture can be directly transferred to the second heating step. When adding the water-soluble substance (e.g. water glass) among the aforementioned optional components, the water-soluble substance can be added in this mixing step. An order of charging the respective components into a container or the like is not particularly limited. An amount of water is also not particularly limited, but is normally 30 to 300 parts by mass based on 100 parts by mass of the aluminosilicate source (A) from the viewpoint that the curable composition does not contain excessive water and homogeneity in a mixture can be readily obtained. Water may be independently added, or alternatively, when water glass is used as an alkali metal source different from the alkali metal hydroxide (B), water may be added in a form of water as the solvent of water glass. After a water-soluble substance [e.g. the alkali metal hydroxide (B), and, if necessary, an optional water-soluble component (e.g. water glass or the like)] is previously dissolved in water to prepare an aqueous solution, the obtained aqueous solution may be mixed with the aluminosilicate source (A). In addition, neither mixing time is particularly limited, and it is only necessary to mix the components until homogeneity in a mixture is obtained.

Subsequently, the obtained mixture is heated to 50 to 180° C. (preferably 80 to 160° C.) and reacted, and then cooled to 50° C. or lower (preferably 30° C. or lower) to form a precursor. Since the alkali-silica reaction can readily proceed by heating, a silicate monomer required for the poly-condensation reaction, the pozzolanic reaction, and the water-insoluble substance production reaction can be readily supplied. Thus, in one embodiment of the production method according to the present invention, since a sufficient amount of the silicate monomer for the reaction is supplied from the aluminosilicate source (A) even when water glass as an optional component is not added which can supplement the silicate monomer required for the reaction, the molded body according to the present invention can be produced.

Subsequently, the calcium ion source (C), the alkali resistant fiber (D), and, if necessary, a water-insoluble optional component (e.g. aggregate) are added to the obtained precursor mixture, and further mixed. From the viewpoint of more readily obtaining homogeneity in a curable composition, it is preferable that after the obtained precursor mixture, the calcium ion source (C), and, if necessary, a water-insoluble optional component are mixed to obtain a homogeneous mixture, the alkali resistant fiber (D) is added to the mixture. A predetermined amount of the alkali resistant fiber (D) may be added in one portion or in two or more portions. As a method for adding the alkali resistant fiber (D), it is preferable to add fibers in a state that the fibers are aligned and converged in one direction from the viewpoint of more readily obtaining homogeneity in a curable composition. Neither mixing time is particularly limited, and it is only necessary to mix the components until homogeneity in a mixture is obtained.

Subsequently, the obtained curable composition is molded, and then the curable composition is cured so as to resist the production process including form removal, transfer, and the like. In the production method according to the present invention, the obtained curable composition can be molded using a publicly-known technique such as a so-called casting method in which a curable composition is casted into an opened mold, a dehydration molding method in which a curable composition is dehydrated by pressing or suction, an injection molding method in which a slurry is injected into a closed mold, or an extrusion molding method in which a molded body having a certain shape can be molded through a mouth ring. At this time, a pressure and/or vibration may be applied as necessary. In addition, the curable composition may be pressed by pressing using an upper face mold, a roll, or the like. The curing may be performed normally under normal pressure or increased pressure, at a temperature of 20 to 95° C., e.g. room temperature (25° C.) or 90° C., and at a relative humidity of 20 to 99%. The curing time is appropriately set depending on a pressure, temperature, and/or humidity at which the curing is performed. The higher the pressure, temperature and humidity are, the shorter the curing time is, and the lower the pressure, temperature and humidity are, the longer the curing time is. For example, when normal pressure steam curing is carried out at a temperature of 80° C. and a humidity of 90% or higher (wet curing), the curing may be performed for about 4 to 24 hours. The curable composition is hardened by the curing. Subsequently, additional curing may be performed, and in this case, the curing conditions of the additional curing may be the same as or different from those of the initial curing.

The molded body obtained by the aforementioned production methods can have high strength, high ductility and excellent dimensional stability, since it is formed from the curable composition having good reactivity resulting from inclusion of the specified aluminosilicate source, alkali metal hydroxide, calcium ion source and alkali resistant fiber, and the curable composition undergoes a reaction process of a combination of the alkali-silica reaction and the pozzolanic reaction. In addition, the molded body can have incombustibility and fire resistance, since the matrix of the molded body is an inorganic polymer. Furthermore, the molded body can have a stable quality, since the components of the curable composition (particularly, the alkali resistant fiber) are more uniformly mixed by the production in accordance with the aforementioned methods.

EXAMPLES

Hereinafter, the present invention will be more specifically explained with reference to Examples and Comparative Examples, but the present invention is not limited to these examples.
<Measurement Method and Evaluation Method>
Various measurement methods and evaluation methods in Examples and Comparative Examples are as follows.
[$SiO_2$ Content and Amorphous Ratio in Aluminosilicate Source]

An $SiO_2$ content was determined by quantifying an Si content by a fluorescent X-ray measuring apparatus (RIX3100, produced by Rigaku Co.) and converting the Si content in terms of oxides.

In addition, an amorphous ratio was calculated in accordance with the following method.

(i) An abundance ratio of whole crystals contained in the aluminosilicate source was quantified by Rietveld analysis using an X-ray diffractometer (SmartLab, produced by Rigaku Co.).

(ii) The aluminosilicate source was charged into a muffle furnace (P0310, produced by Yamato Scientific Co., Ltd.) set at 1000° C., and an ignition loss was determined from a change in the mass between before and after the charging.

(iii) An amorphous ratio was calculated in accordance with the following mathematical formula.

$$\text{Amorphous ratio (\% by mass)}=100-\text{ignition loss (\% by mass)}-\text{sum of crystal abundance ratio (\% by mass)} \quad \text{[Mathematical formula 1]}$$

[Average Particle Diameter of Aluminosilicate Source, and Proportion of Aluminosilicate Source Having Average Particle Diameter of 10 μm or Smaller]

An average particle diameter of the aluminosilicate source, and a proportion of the aluminosilicate source having an average particle diameter of 10 μm or smaller were determined from a particle size distribution obtained using a dynamic light-scattering photometer DLS-7000 produced by Otsuka Electronics Co., Ltd.

[Average Fiber Diameter and Aspect Ratio of Alkali Resistant Fiber (D)]

Regarding an average fiber diameter, 20 fibers were randomly taken out, a fiber diameter in the middle of the length direction of each fiber was measured with an optical microscope, and the average value was defined as the average fiber diameter. An average fiber length was calculated in accordance with JIS L 1015 "Test Methods for Man-Made Staple Fibres (8.5.1)", and an aspect ratio of the fiber was determined from a ratio between the average fiber length and the average fiber diameter.

[Content of Alkali Resistant Fiber (D), and Variation Coefficient of Average Content of Alkali Resistant Fiber (D)]

Pieces with a weight of 20 g were cut out from the molded body, 11 pieces were randomly selected among the cut pieces, dried at 105° C. for 3 hours, and then a weight of each cut piece [$W_1$ to $W_{11}$ (g)] was measured.

Among the 11 cut pieces, one was pulverized in a mortar. Herein, a case of pulverizing a cut piece having a weight of $W_{11}$ (g) will be explained. After the pulverizing, water was added to the pulverized material, which was filtered through a 10-mesh wire net to separate the alkali resistant fiber (D) and a matrix. Subsequently, a matrix was collected by further filtering the filtrate through a filter paper, the matrix was dried at 105° C. for 3 hours, and then a weight $W_{11-1}$ (g) of the matrix was precisely measured. Subsequently, the matrix was charged in the muffle furnace at 600° C. for 30 minutes, then cooled, and then the weight $W_{11-2}$ (g) of the matrix was measured to calculate a weight loss ratio X (%) of the matrix in accordance with the following mathematical formula.

Weight loss ratio $X$ (%) of matrix=$\{(W_{11-1}-W_{11-2})/W_{11-1}\}\times 100$     [Mathematical formula 2]

Subsequently, the remaining 10 cut pieces [cut pieces having weights of $W_1$ to $W_{10}$ (g)] were charged in the muffle furnace at 600° C. for 30 minutes to burn the alkali resistant fiber (D) contained in the cut pieces, then cooled, and then each weight [$W_{1-1}$ to $W_{10-1}$ (g)] was measured.

A content of the alkali resistant fiber (D) in the cut piece having a weight of $W_1$ (g) was calculated in accordance with the following mathematical formula.

Content (%) of alkali resistant fiber(D) in cut piece having weight of $W_1$=$[\{W_1\times(100-X)/100-W_{1-1}\}/W_1]\times 100$     [Mathematical formula 3]

Also for each of the cut pieces having weights of $W_2$ to $W_{10}$ (g), the content of the alkali resistant fiber (D) was calculated.

Furthermore, a standard deviation and an average value of the content of the alkali resistant fiber (D) in the cut pieces having weights of $W_1$ to $W_{10}$ (g) were calculated to calculate a variation coefficient of the average content of the alkali resistant fiber (D) in accordance with the following mathematical formula.

Variation coefficient (%) of content of alkali resistant fiber $(D)$=$\{$standard deviation of content (%) of alkali resistant fiber $(D)$/average content (%) of alkali resistant fiber $(D)$, in each cut piece$\}$=100     [Mathematical formula 4]

In addition, from the content of the alkali resistant fiber (D) in each of the cut pieces having weights of $W_1$ to $W_{10}$ (g) determined in accordance with the above method, a proportion of the alkali resistant fiber (D) based on 100 parts by mass of each cut piece was calculated. An average of the proportions was calculated, and defined as the proportion of the alkali resistant fiber (D) based on 100 parts by mass of the molded body.

[Bending Strength and Bending Toughness, and Variation Coefficient of Bending Strength of Molded Body]

Bending strength and bending toughness of the molded body were determined by performing a bending test with n=6 in a third-point loading manner in accordance with JIS A 1106: 2006. In addition, a variation coefficient of the bending strength was calculated in accordance with the following mathematical formula.

Variation coefficient (%) of the bending strength=
[standard deviation of bending strength
$(N/mm^2)$/average value of bending strength
$(N/mm^2)$, in each test
molded body]$\times 100$     [Mathematical formula 5]

[Dimensional Change Rate of Molded Body]

According to JIS A 5430, the molded body was put into a dryer with a stirrer, the temperature of the dryer was maintained at 60±3° C., and after 24 hours, the molded body was taken out, put into a desiccator humidity-controlled with silica gel, and left until the temperature reached 20±1.5° C. Subsequently, a milk-colored glass was attached to the molded body, and gauge lines were marked such that a distance between the gauge lines was about 140 μm, a length between the gauge lines was measured using a comparator with an accuracy of 1/500 μm, and this length was defined as the length between the gauge lines in a dry state. Subsequently, the molded body was erected such that the length direction of the molded body was horizontal, and immersed in water at 20° C.±1.5° C. such that the upper surface of the molded body is about 30 μm below the water surface. After 24 hours, the molded body was taken out of water, water adhering to the surface was wiped off, the length between the gauge lines was measured again, and this length was defined as the length between the gauge lines in a water absorption state. Then, a dimensional change rate of the molded body due to the water absorption was calculated in accordance with the following mathematical formula.

Dimensional change rate (%)=[{length between
gauge lines in water absorption state
(mm) −length between gauge lines in dry
state (mm)}/length between gauge
lines in dry state (mm)]$\times 100$     [Mathematical formula 6]

Example 1

Using the materials shown in Table 1 and Table 2 mentioned below, curable compositions were prepared in amounts shown in Table 2, and molded bodies were produced from the obtained curable compositions.

Specifically, first, an alkali metal compound in an amount shown in Table 2 was dissolved in water to prepare an aqueous solution of the alkali metal compound. Next, an aluminosilicate source, a calcium ion source and sand in amounts shown in Table 2 were put into a mortar mixer and mixed for 1 minute, then the aqueous solution was put into the mortar mixer, and mixed for 3 minutes. Subsequently, fibers aligned and converged in one direction in an amount shown in Table 2 were put into a mortar mixer and mixed for another 1 minute to prepare a curable composition. The obtained curable composition was poured and filled into a mold of 6 cm in width×25 cm in length×1 cm in thickness, cured under normal pressure at 80° C.×RH90% for 8 hours, and then demolded to produce a molded body.

The obtained molded body was evaluated as described above. The results are shown in Table 2.

Example 2

A molded body was produced in the same manner as in Example 1 except that the proportion of the fiber was changed as shown in Table 2.

The obtained molded body was evaluated as described above. The results are shown in Table 2.

Example 3

A molded body was produced in the same manner as in Example 1 except that the amorphous ratio of the aluminosilicate source was changed as shown in Table 2.

The obtained molded body was evaluated as described above. The results are shown in Table 2.

Example 4

A molded body was produced in the same manner as in Example 1 except that the average particle diameter of the aluminosilicate source, and the proportion of the aluminosilicate source having an average particle diameter of 10 μm or smaller were changed as shown in Table 2.

The obtained molded body was evaluated as described above. The results are shown in Table 2.

Example 5

A molded body was produced in the same manner as in Example 1 except that the type of the fiber was changed as shown in Table 2.

The obtained molded body was evaluated as described above. The results are shown in Table 2.

Example 6

An alkali metal compound in an amount shown in Table 2 was dissolved in water to prepare an aqueous solution of the alkali metal compound. This aqueous solution and an aluminosilicate source in an amount shown in Table 2 were put into a stirring type heat-resistant container, stirred at 120° C. for 4 hours, and then cooled to room temperature (25° C.) to form a precursor. This precursor, a calcium ion source and sand in amounts shown in Table 2 were put into a mortar mixer, mixed for 3 minutes, then fibers aligned and converged in one direction in an amount shown in Table 2 were put into a mortar mixer, and mixed for another 1 minute to prepare a curable composition. The obtained curable composition was poured and filled into a mold of 6 cm in width×25 cm in length×1 cm in thickness, cured under normal pressure at 80° C.×RH90% for 8 hours, and then demolded to produce a molded body.

The obtained molded body was evaluated as described above. The results are shown in Table 2.

Example 7

A molded body was produced in the same manner as in Example 1 except that the proportion of the calcium hydroxide was changed as shown in Table 2.

The obtained molded body was evaluated as described above. The results are shown in Table 2.

Example 8

A molded body was produced in the same manner as in Example 1 except that the average particle diameter of the aluminosilicate source, and the proportion of the aluminosilicate source having an average particle diameter of 10 μM or smaller were changed as shown in Table 2.

The obtained molded body was evaluated as described above. The results are shown in Table 2.

Example 9

A molded body was produced in the same manner as in Example 1 except that type II fly ash was used instead of volcanic ash produced in Kagoshima.

The obtained molded body was evaluated as described above. The results are shown in Table 2.

Example 10

A molded body was produced in the same manner as in Example 1 except that the alkali resistant fiber was changed from PVA1 to PVA2.

The obtained molded body was evaluated as described above. The results are shown in Table 2.

Comparative Example 1

A molded body was produced in the same manner as in Example 1 except that the alkali resistant fiber was not added.

The obtained molded body was evaluated as described above. The results are shown in Table 2.

Comparative Example 2

A molded body was produced in the same manner as in Example 1 except that the alkali metal compound was not added.

The obtained molded body was evaluated as described above. The results are shown in Table 2.

Comparative Example 3

A molded body was produced in the same manner as in Example 1 except that the calcium ion source was not added.

The obtained molded body was evaluated as described above. The results are shown in Table 2.

Comparative Example 4

A molded body was produced in the same manner as in Example 1 except that the average particle diameter of the aluminosilicate source, and the proportion of the aluminosilicate source having an average particle diameter of 10 μm or smaller were changed as shown in Table 2.

The obtained molded body was evaluated as described above. The results are shown in Table 2.

Comparative Example 5

A molded body was produced in the same manner as in Example 1 except that the average particle diameter of the aluminosilicate source, and the proportion of the aluminosilicate source having an average particle diameter of 10 μm or smaller were changed as shown in Table 2.

The obtained molded body was evaluated as described above. The results are shown in Table 2.

Comparative Example 6

A molded body was produced in the same manner as in Example 1 except that volcanic ash produced in Kagoshima having physical properties shown in Table 2 was used as the aluminosilicate source.

The obtained molded body was evaluated as described above. The results are shown in Table 2.

TABLE 1

|      | Average fiber diameter [μm] | Aspect ratio [—] | Average fiber strength [cN/dtex] |
|------|---|---|---|
| PVA1 | 26 | 230 | 13.8 |
| PVA2 | 38 | 210 | 12.5 |
| PP   | 65 | 185 | 5.5 |

TABLE 2

| | Aluminosilicate source | | | | | Calcium ion source | | Alkali metal compound | | | |
|---|---|---|---|---|---|---|---|---|---|---|---|
| | Type | SiO$_2$ [% by mass] | Amorphous ratio [% by mass] | Average particle diameter [μm] | Proportion of aluminosilicate source having average particle diameters of 10 μm or smaller [% by mass] | [parts by mass] | Ca(OH)$_2$ [parts by mass] | Water-granulated blast furnace slag [parts by mass] | NaOH [parts by mass] | Water glass #1 [parts by mass] | Water [parts by mass] | Sand [parts by mass] |
| Example 1 | Volcanic ash produced in Kagoshima | 76 | 88 | 5 | 75 | 100 | 19 | 48 | 14 | 102 | 54 | 207 |
| Example 2 | Volcanic ash produced in Kagoshima | 76 | 88 | 5 | 75 | 100 | 19 | 48 | 14 | 102 | 54 | 207 |
| Example 3 | Volcanic ash produced in Kagoshima | 76 | 62 | 5 | 75 | 100 | 19 | 48 | 14 | 102 | 54 | 207 |
| Example 4 | Volcanic ash produced in Kagoshima | 76 | 88 | 10 | 50 | 100 | 19 | 48 | 14 | 102 | 54 | 207 |
| Example 5 | Volcanic ash produced in Kagoshima | 76 | 88 | 5 | 75 | 100 | 19 | 48 | 14 | 102 | 54 | 207 |
| Example 6 | Volcanic ash produced in Kagoshima | 76 | 88 | 5 | 75 | 100 | 19 | 48 | 50 | — | 110 | 207 |
| Example 7 | Volcanic ash produced in Kagoshima | 76 | 88 | 5 | 75 | 100 | 80 | 48 | 14 | 102 | 54 | 207 |
| Example 8 | Volcanic ash produced in Kagoshima | 76 | 88 | 40 | 35 | 100 | 19 | 48 | 14 | 102 | 54 | 207 |
| Example 9 | Type II fly ash | 59 | 72 | 18 | 34 | 100 | 19 | 48 | 14 | 102 | 54 | 207 |
| Example 10 | Volcanic ash produced in Kagoshima | 76 | 88 | 5 | 75 | 100 | 19 | 48 | 14 | 102 | 54 | 207 |
| Comparative Example 1 | Volcanic ash produced in Kagoshima | 76 | 88 | 5 | 75 | 100 | 19 | 48 | 14 | 102 | 54 | 207 |
| Comparative Example 2 | Volcanic ash produced in Kagoshima | 76 | 88 | 5 | 75 | 100 | 19 | 48 | — | — | 130 | 207 |
| Comparative Example 3 | Volcanic ash produced in Kagoshima | 76 | 88 | 5 | 75 | 100 | — | — | 14 | 102 | 54 | 207 |
| Comparative Example 4 | Volcanic ash produced in Kagoshima | 76 | 88 | 80 | 9 | 100 | 19 | 48 | 14 | 102 | 54 | 207 |
| Comparative Example 5 | Volcanic ash produced in Kagoshima | 76 | 88 | 60 | 25 | 100 | 19 | 48 | 14 | 102 | 54 | 207 |
| Comparative Example 6 | Volcanic ash produced in Kagoshima | 70 | 35 | 500 | 0 | 100 | 19 | 48 | 14 | 102 | 54 | 207 |

| | Aluminosilicate source Type | Alkali resistant fiber Type | Convergence of fiber | [parts by mass] | Alkali resistant fiber based on 100 parts by mass of molded body [parts by mass] | Variation coefficient of average content rate of fiber [%] | Formation of precursor (treatment temperature) | Bending strength [N/mm$^2$] | Variation coefficient of bending strength [%] | Bending toughness [Nmm] | Dimensional change rate [%] |
|---|---|---|---|---|---|---|---|---|---|---|---|
| Example 1 | Volcanic ash produced in Kagoshima | PVA1 | With | 4 | 1.1 | 8 | Without | 15 | 13 | 1400 | 0.11 |
| Example 2 | Volcanic ash produced in Kagoshima | PVA1 | With | 8 | 2.1 | 10 | Without | 20 | 15 | 2600 | 0.11 |

TABLE 2-continued

| | | | | | | | | | | | |
|---|---|---|---|---|---|---|---|---|---|---|---|
| Example 3 | Volcanic ash produced in Kagoshima | PVA1 | With | 4 | 1.1 | 8 | Without | 12 | 12 | 1000 | 0.12 |
| Example 4 | Volcanic ash produced in Kagoshima | PVA1 | With | 4 | 1.1 | 9 | Without | 11 | 13 | 950 | 0.12 |
| Example 5 | Volcanic ash produced in Kagoshima | PP | With | 4 | 1.1 | 15 | Without | 10 | 18 | 1800 | 0.12 |
| Example 6 | Volcanic ash produced in Kagoshima | PVA1 | With | 4 | 1.0 | 10 | With (120° C.) | 11 | 14 | 1000 | 0.12 |
| Example 7 | Volcanic ash produced in Kagoshima | PVA1 | With | 4 | 0.9 | 8 | Without | 19 | 14 | 2200 | 0.10 |
| Example 8 | Volcanic ash produced in Kagoshima | PVA1 | With | 4 | 1.1 | 10 | Without | 8 | 14 | 600 | 0.19 |
| Example 9 | Type II fly ash | PVA1 | With | 4 | 1.1 | 9 | Without | 15 | 14 | 1000 | 0.11 |
| Example 10 | Volcanic ash produced in Kagoshima | PVA2 | With | 4 | 1.1 | 6 | Without | 12 | 10 | 1600 | 0.12 |
| Comparative Example 1 | Volcanic ash produced in Kagoshima | — | — | — | 0 | — | Without | 12 | 9 | 60 | 0.12 |
| Comparative Example 2 | Volcanic ash produced in Kagoshima | PVA1 | With | 4 | 1.0 | 9 | Without | 6 | 14 | 450 | 0.20 |
| Comparative Example 3 | Volcanic ash produced in Kagoshima | PVA1 | With | 4 | 1.1 | 10 | Without | 7 | 11 | 520 | 0.25 |
| Comparative Example 4 | Volcanic ash produced in Kagoshima | PVA1 | With | 4 | 1.1 | 11 | Without | 4 | 16 | 250 | 0.23 |
| Comparative Example 5 | Volcanic ash produced in Kagoshima | PVA1 | With | 4 | 1.1 | 11 | Without | 7 | 16 | 530 | 0.21 |
| Comparative Example 6 | Volcanic ash produced in Kagoshima | PVA1 | With | 4 | 1.1 | 10 | Without | 3 | 25 | 200 | 0.14 |

As shown in Table 2, the molded bodies according to the present invention formed from the curable compositions containing the specified aluminosilicate source, alkali metal hydroxide, calcium ion source and alkali resistant fiber respectively had high bending strength, high bending toughness, and a low dimensional change rate, i.e. high strength, high ductility, and excellent dimensional stability. Also, the molded bodies according to the present invention had a lower variation coefficient of the average fiber content and a lower variation coefficient of the bending strength. This means a little variation in the average fiber content and a little variation in the bending strength, and means that a molded body having a more stable quality was obtained.

On the other hand, the molded body formed from the curable composition not containing the alkali resistant fiber (Comparative Example 1) had remarkably low bending toughness. The molded body formed from the curable composition not containing the alkali metal hydroxide (Comparative Example 2), the molded body formed from the curable composition not containing the calcium ion source (Comparative Example 3), and the molded bodies formed from the curable compositions not containing the specified aluminosilicate source in the present invention (Comparative Examples 4 and 5) had lower bending strength, lower bending toughness, and a higher dimensional change rate. The molded body formed from the curable composition not containing the specified aluminosilicate source in the present invention (Comparative Example 6) had remarkably low bending strength and bending toughness. In addition, the molded body in Comparative Example 6 had a high variation coefficient of the average fiber content and a high variation coefficient of the bending strength, i.e. a large variation in the average fiber content and a large variation in the bending strength. Such a molded body has lower quality stability.

INDUSTRIAL APPLICABILITY

The molded body according to the present invention has incombustibility and fire resistance because a matrix of the molded body is an inorganic polymer. Furthermore, since the molded body according to the present invention is formed from a curable composition having good reactivity resulting from inclusion of the specified aluminosilicate sources, alkali metal hydroxide, calcium ion source, and alkali resistant fiber, and since the curable composition undergoes a reaction process using a combination of an alkali-silica reaction and a pozzolanic reaction, the molded body according to the present invention has high strength, high ductility, and excellent dimensional stability. Consequently, the molded body according to the present invention can be effectively used as e.g., but not particularly limited to, various construction materials such as building blocks, floor materials, wall materials, ceiling materials, partitions, roof materials, and roofing-tiles.

The invention claimed is:
1. A molded body formed from a curable composition comprising (A) at least one aluminosilicate source, (B) an alkali metal hydroxide, (C) a calcium ion source, and (D) an alkali resistant fiber, wherein the aluminosilicate source (A) has an SiO$_2$ content of 50% by mass or more based on a total mass of the aluminosilicate source (A), an amorphous ratio of 50% by mass or higher, and an average particle diameter of 50 μm or smaller, and comprises an aluminosilicate source having an average particle diameter of 10 μm or smaller in an amount of 30% by mass or more based on the total mass of the aluminosilicate source (A), and wherein the curable composition comprises 10 to 140 parts by mass of the calcium ion source (C) based on 100 parts by mass of the aluminosilicate source (A).

2. The molded body according to claim 1, comprising at least a volcanic ash-derived substance as the aluminosilicate source (A).

3. The molded body according to claim 1, wherein the curable composition comprises 10 to 100 parts by mass of the alkali metal hydroxide (B) based on 100 parts by mass of the aluminosilicate source (A).

4. The molded body according to claim 1, wherein a content of the alkali resistant fiber (D) is 0.1 to 5 parts by mass based on 100 parts by mass of the molded body.

5. The molded body according to claim 1, wherein the alkali resistant fiber (D) has an average fiber diameter of 100 μm or smaller, and an aspect ratio of 50 to 2,000.

6. The molded body according to claim 1, wherein a variation coefficient of an average content of the alkali resistant fiber (D) contained in 10 cut pieces with a weight of 20 g cut out from a whole or a part of the molded body is 30% or lower.

7. The molded body according to claim 1, wherein the alkali resistant fiber (D) is at least one selected from the group consisting of a polyvinyl alcohol-based fiber, a polyethylene fiber, a polypropylene fiber, an acrylic fiber, and an aramid fiber.

8. A method for producing the molded body according to claim 1, comprising
mixing a component comprising at least one aluminosilicate source (A), an alkali metal hydroxide (B), and a calcium ion source (C), with water,
preparing a curable composition by adding an alkali resistant fiber (D) to the obtained mixture and further mixing the mixture, and
obtaining the molded body by molding the obtained curable composition and then curing the curable composition.

9. The method according to claim 8, wherein the aluminosilicate source (A) comprises at least a volcanic ash-derived substance.

10. A method for producing a molded body, comprising
mixing at least one aluminosilicate source (A) and an alkali metal hydroxide (B), with water,
forming a precursor by heating the obtained mixture to 50 to 180° C. to react the mixture, and then cooling the mixture to 50° C. or lower,
preparing a curable composition by adding a component comprising a calcium ion source (C) and an alkali resistant fiber (D) to the obtained precursor and further mixing the mixture, and
obtaining the molded body by molding the obtained curable composition and then curing the curable composition.

11. A molded body formed from a curable composition comprising (A) at least one aluminosilicate source, (B) an alkali metal hydroxide, (C) a calcium ion source, and (D) an alkali resistant fiber,
wherein the aluminosilicate source (A) has an SiO$_2$ content of 50% by mass or more based on a total mass of the aluminosilicate source (A), an amorphous ratio of 50% by mass or higher, and an average particle diameter of 50 μm or smaller, and comprises an aluminosilicate source having an average particle diameter of 10 μm or smaller in an amount of 30% by mass or more based on the total mass of the aluminosilicate source (A), and
wherein the molded body formed from a curable composition comprises at least a volcanic ash-derived substance as the aluminosilicate source (A).

* * * * *